(12) United States Patent
Koshoffer

(10) Patent No.: US 7,437,876 B2
(45) Date of Patent: Oct. 21, 2008

(54) AUGMENTER SWIRLER PILOT

(75) Inventor: John Michael Koshoffer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 690 days.

(21) Appl. No.: 11/089,614

(22) Filed: Mar. 25, 2005

(65) Prior Publication Data

US 2006/0213180 A1   Sep. 28, 2006

(51) Int. Cl.
*F02K 3/10* (2006.01)
(52) U.S. Cl. .............................. 60/761; 60/762; 60/764; 60/765; 60/766; 60/776; 60/737; 60/738
(58) Field of Classification Search .................. 60/737, 60/743, 761, 765, 776, 766
See application file for complete search history.

(56) References Cited

U.S. PATENT DOCUMENTS

| | | |
|---|---|---|
| 3,701,255 A | 10/1972 | Markowski |
| 3,747,345 A | 7/1973 | Markowski |
| 4,072,008 A | 2/1978 | Kenworthy et al. |
| 4,134,260 A | 1/1979 | Lefebvre et al. |
| 4,145,879 A | 3/1979 | Markowski |
| 4,145,880 A | 3/1979 | Markowski |
| 4,214,441 A | 7/1980 | Mouritsen et al. |
| 4,285,194 A | 8/1981 | Nash |
| 4,409,788 A | 10/1983 | Nash et al. |
| 4,817,378 A | 4/1989 | Giffin, III et al. |
| 5,117,628 A | 6/1992 | Koshoffer |
| 5,182,905 A | 2/1993 | Stransky et al. |
| 5,343,697 A | 9/1994 | Johnson et al. |
| 5,385,015 A | 1/1995 | Clements et al. |
| 5,433,596 A | 7/1995 | Dobbeling et al. |
| 5,544,480 A | 8/1996 | Edwards |

(Continued)

FOREIGN PATENT DOCUMENTS

JP    407332621 A    12/1995

(Continued)

OTHER PUBLICATIONS

AIAA 95-0810, Performance of a Trapped-Vortex Combustor, 33rd Aerospace Sciences Meeting and Exhibit, Jan. 9-12, 1995 / Reno, NV, 14 pages.

(Continued)

*Primary Examiner*—Quang D. Thanh
*Assistant Examiner*—Phutthiwat Wongwian
(74) *Attorney, Agent, or Firm*—William Scott Andes; Steven J. Rosen

(57) ABSTRACT

A turbofan gas turbine engine augmenter includes a fuel/air swirler disposed between an axially extending bypass flowpath and an axially extending exhaust flowpath. A swirler inlet is axially open to and positioned substantially normal to the bypass flowpath and a swirler outlet is open to and positioned substantially parallel to the exhaust flowpath. A swirl chamber within the fuel/air swirler is between the swirler inlet and the swirler outlet. A swirl axis of the fuel/air swirler extends through the swirler outlet substantially normal to the exhaust flowpath. An air swirler may be centered about the swirl axis within the fuel/air swirler. The air swirler may be a louvered or have a plurality of swirling vanes. The swirler inlet may be radially offset with respect to the swirl axis. An air scoop may lead from the swirler inlet to a rounded swirler housing within which the air swirler is disposed.

41 Claims, 9 Drawing Sheets

U.S. PATENT DOCUMENTS

| | | | |
|---|---|---|---|
| 5,617,717 A | 4/1997 | Asquith et al. | |
| 5,619,855 A | 4/1997 | Burrus | |
| 5,664,415 A | 9/1997 | Terrier | |
| 5,685,142 A | 11/1997 | Brewer et al. | |
| 5,791,148 A | 8/1998 | Burrus | |
| 5,809,772 A | 9/1998 | Giffin, III et al. | |
| 5,813,221 A | 9/1998 | Geiser et al. | |
| 5,857,339 A | 1/1999 | Roquemore et al. | |
| 6,295,801 B1 | 10/2001 | Burrus et al. | |
| 6,438,940 B1 | 8/2002 | Vacek et al. | |
| 6,463,739 B1 | 10/2002 | Mueller et al. | |
| 6,497,103 B2 | 12/2002 | Johnson et al. | |
| 6,668,541 B2 | 12/2003 | Rice et al. | |
| 2002/0112482 A1 | 8/2002 | Johnson et al. | |
| 2004/0216444 A1 | 11/2004 | Lovett | |

OTHER PUBLICATIONS

U.S. Appl. No. 10/215,477, filed Aug. 5, 2002, "Augmenter With Trapped Vortex Flame Stabilizer".

AUGMENTER SWIRLER PILOT

BACKGROUND OF THE INVENTION

The present invention relates generally to aircraft gas turbine engine augmenters and, more specifically, to augmenter pilots.

High performance military aircraft typically include a turbofan gas turbine engine having an afterburner or augmenter for providing additional thrust when desired. The turbofan engine includes, in serial flow communication, a multistage fan, a multistage compressor, a combustor, a high pressure turbine powering the compressor, and a low pressure turbine powering the fan. During operation, air is compressed in turn through the fan and compressor and mixed with fuel in the combustor and ignited for generating hot combustion gases which flow downstream through the turbine stages which extract energy therefrom. The hot core gases are then discharged into an augmenter from which they are discharged from the engine through a variable area exhaust nozzle.

The augmenter includes an exhaust casing and liner therein which defines a combustion zone. Fuel spraybars and flameholders are mounted between the turbines and the exhaust liner for injecting additional fuel when desired during reheat, thrust augmentation, or afterburning operation for burning in the augmenter combustor for producing additional thrust.

In a bypass turbofan engine, an annular bypass duct extends from the fan to the augmenter for bypassing a portion of the fan air around the core engine to the augmenter which bypass air is used in part for cooling the exhaust liner. The bypass air must also be efficiently mixed with the core gases prior to discharge through the exhaust nozzle. This is typically accomplished using a convoluted daisy mixer having circumferentially alternating hot and cold chutes which respectively channel the core gases and bypass air therethrough in radially outward and inward paths for mixing at the exit plane thereof.

Various types of flameholders are known and typically include radial and circumferential V-shaped gutters which provide stagnation regions there behind of local low velocity regions in the otherwise high velocity core gases for sustaining combustion during reheat operation. Augmenter operation includes fuel injection into an augmenter combustion zone and ignition is initiated by some type of spark discharge or other igniter or auto-ignition dues to hot core gases. Since the rate of gas flow through an augmenter is normally much greater than the rate of flame propagation in the flowing gas, some means for stabilizing the flame is usually provided, else the flame will simply blow out the rear of the engine, and new fuel being injected will not be ignited.

Typically, flameholders are used for flame stabilization. In regions where the gas flow is partially recirculated and the velocity is less than the rate of flame propagation, there will be a stable flame existing which can ignite new fuel as it passes. Unfortunately, flameholders in the gas stream inherently cause flow losses and reduced engine efficiency.

Since the core gases are the product of combustion in the core engine, they are initially hot, and are further heated when combusted with the bypass air and additional fuel during reheat operation. The mixing of the core gases with the bypass air results in cooling of the core gases. Augmenters require an ignition source in the cases where the core gas conditions are not conducive to reliable auto-ignition so pilots are used to start and maintain combustion in the afterburner. One potential problem with an afterburner is that, at some flight conditions, its pilot stage may not light due to an excessively lean fuel-air ratio in the vicinity of the igniters. A second problem is that the time in an operating pilot stage may blow out when the aircraft fuel system supplies fuel to pilot spray rings or bars. This latter problem occurs because the fuel pressure in the pilot spray ring momentarily diminishes as the aircraft fuel system initially attempts to supply both the pilot spray ring and the auxiliary spray rings. As a result, the fuel-air ratio becomes too lean to sustain combustion of the pilot flame.

Thus, it is highly desirable to have an augmenter or afterburner that can produce a stable flame and have reliable ignition for igniting thrust augmenting fuel while holding down flow losses and attendant reductions in engine performance and fuel efficiency.

SUMMARY OF THE INVENTION

A turbofan gas turbine engine augmenter includes a fuel/air swirler disposed between an axially extending bypass flowpath and an axially extending exhaust flowpath. The fuel/air swirler includes a swirler inlet axially open to and positioned substantially normal to the bypass flowpath and a swirler outlet open to and positioned substantially parallel to the exhaust flowpath. A swirl chamber within the fuel/air swirler is operably disposed between the swirler inlet and the swirler outlet. A swirl axis of the fuel/air swirler extends through the swirler outlet and is substantially normal to the exhaust flowpath. An exemplary embodiment of the augmenter further includes an air swirler within the fuel/air swirler centered about the swirl axis within the fuel/air swirler. The air swirler may be louvered or have a plurality of swirling vanes. The swirler inlet is radially offset with respect to the swirl axis.

An exemplary embodiment of the fuel/air swirler includes an air scoop leading from the swirler inlet to a rounded swirler housing. The air swirler is disposed within the rounded swirler housing. The air scoop has a swirler inlet sidewall extending from the swirler inlet to the swirler housing and the swirler inlet sidewall is substantially tangentially attached to the swirler housing. The air scoop may be designed with some inlet pre-diffusion with, for example, a 15% inlet pre-diffusion. An exemplary embodiment of the air swirler is a swirler cup which may be louvered or have a plurality of swirling vanes.

The exemplary embodiment of the augmenter includes a fuel injector and an igniter disposed through the swirler housing and a means for injecting fuel into the exhaust flowpath for combustion in a combustion zone downstream of the fuel/air swirler. A plurality of circumferentially spaced apart radial flameholders extend radially across the combustion zone downstream of the fuel/air swirler. A step ring flameholder is located in a radially outer portion of the combustion zone downstream of the radial flameholders and has an aft-facing annular radial wall attached to an axial wall. The means for injecting fuel may include a plurality of first fuel spraybars of which each of the first fuel spraybars may be disposed within a corresponding one of the radial flameholders.

The exemplary embodiment of the augmenter further includes a mixer between the axially extending bypass flowpath and axially extending exhaust flowpath and having a plurality of tubular injector chutes extending radially inwardly from the mixer into the exhaust flowpath. The radial flameholders extend radially inwardly from an annular mixer wall of the mixer into the exhaust flowpath downstream of the injector chutes. The fuel/air swirler is mounted to the mixer wall upstream of radial flameholders and may be circumferentially located between a pair of the tubular injector chutes.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENTS

Figure 1:
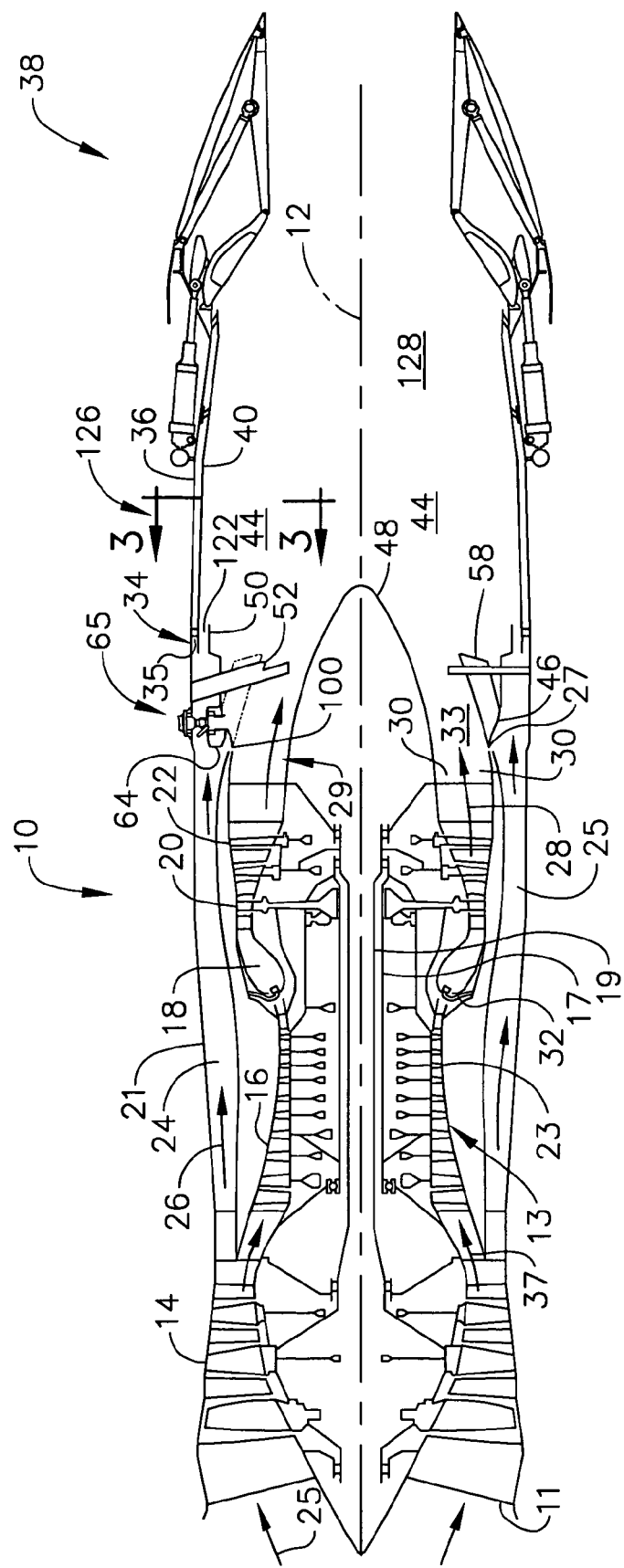
FIG. 1 is an axial sectional view illustration through an exemplary turbofan gas turbine engine having an augmenter swirler pilot augmenter with a fuel/air swirler.

Illustrated in FIG. 1 is an exemplary medium bypass ratio turbofan gas turbine engine 10 for powering an aircraft (not shown) in flight. The engine 10 is axisymmetrical about a longitudinal or axial centerline axis 12 and has a fan section 14 upstream of a core engine 13. The core engine 13 includes, in serial downstream flow communication, a multistage axial high pressure compressor 16, an annular combustor 18, and a high pressure turbine 20 suitably joined to the high pressure compressor 16 by a high pressure drive shaft 17. Downstream of the core engine 13 is a multistage low pressure turbine 22 suitably joined to the fan section 14 by a low pressure drive shaft 19. The core engine 13 is contained within a core engine casing 23 and an annular bypass duct 24 containing a bypass flowpath 25 circumscribed about the core engine 13. An engine casing 21 circumscribes the bypass duct 24 which extends from the fan section 14 downstream past the low pressure turbine 22.

Engine air enters the engine through an engine inlet 11 and is initially pressurized as it flows downstream through the fan section 14 with an inner portion thereof referred to as core engine air 37 flowing through the high pressure compressor 16 for further compression. An outer portion of the engine air is referred to as bypass air 26 and is directed to bypass the core engine 13 and flow through the bypass duct 24. The core engine air is suitably mixed with fuel by fuel injectors 32 and carburetors in the combustor 18 and ignited for generating hot combustion gases which flow through the turbines 20, 22. The hot combustion gases are discharged through an annular core outlet 30 as core gases 28 into an exhaust flowpath 128 extending downstream and aftwardly of the turbines 20, 22 and through a diffuser 29 which is aft and downstream of the turbines 20, 22 in the engine 10.

The diffuser 29 includes a diffuser duct 33 circumscribed by an annular radially outer diffuser liner 46 and is used to decrease the velocity of the core gases 28 as they enter an augmenter 34 of the engine. A converging centerbody 48 extending aft from the core outlet 30 and partially into the augmenter 34 radially inwardly bounds the diffuser duct 33. The diffuser 29 is axially spaced apart upstream or forwardly of a forward end 35 of a combustion liner 40 inside the exhaust casing 36. A bypass duct outlet 27 for passing the bypass air 26 from the bypass duct 24 into the exhaust flowpath 128 and the combustion zone 44 located between the annular diffuser liner 46 and the casing 36. Thus, the combustion zone 44 is located radially inwardly from the bypass duct 24 and downstream and aft of the bypass duct outlet 27.

Referring to FIGS. 1-4, 7, and the bypass duct 24 includes an annular bypass duct outlet 27 for respectively discharging the core gases 28 downstream into an exhaust section 126 of the engine 10. A mixer 31 disposed in the annular bypass duct outlet 27 includes a plurality of tubular injector chutes 58 extending radially inwardly into the exhaust flowpath 128 from the diffusion liner 46. The diffusion liner 46 is illustrated herein as an integral part of the mixer 31 and serves as an annular mixer wall 100 of the mixer 31 from which the injector chutes 58 extending radially inwardly into the diffuser duct 33 which is part of the exhaust flowpath 128. The injector chutes 58 are spaced circumferentially apart between respective pairs of a plurality of circumferentially spaced apart radial flameholders 52. Each injector chute 58 has an inlet 158 co-extensive with the diffusion liner 46 for receiving the bypass air 26 therefrom, and an outlet 159 at an opposite longitudinal or axial end for injecting some of the bypass air 26 into the core gases 28 for mixing in the combustion zone 44. The exhaust section 126 includes an annular exhaust casing 36 disposed co-axially with and suitably attached to the corresponding engine casing 21 and surrounding the exhaust flowpath 128.

Mounted to the aft end of the exhaust casing 36 is a conventional variable area converging-diverging exhaust nozzle 38 through which the bypass air 26 and core gases 28 are discharged during operation. The exhaust section 126 further includes an annular exhaust combustion liner 40 spaced radially inwardly from the exhaust casing 36 to define therebetween an annular cooling duct 42 disposed in flow communication with the bypass duct 24 for receiving therefrom a portion of the bypass air 26. An exhaust section combustion zone 44 within the exhaust flowpath 128 is located radially inwardly from the liner 40 and the bypass duct 24 and downstream or aft of the core engine 13 and the low pressure turbine 22.

Figure 2:
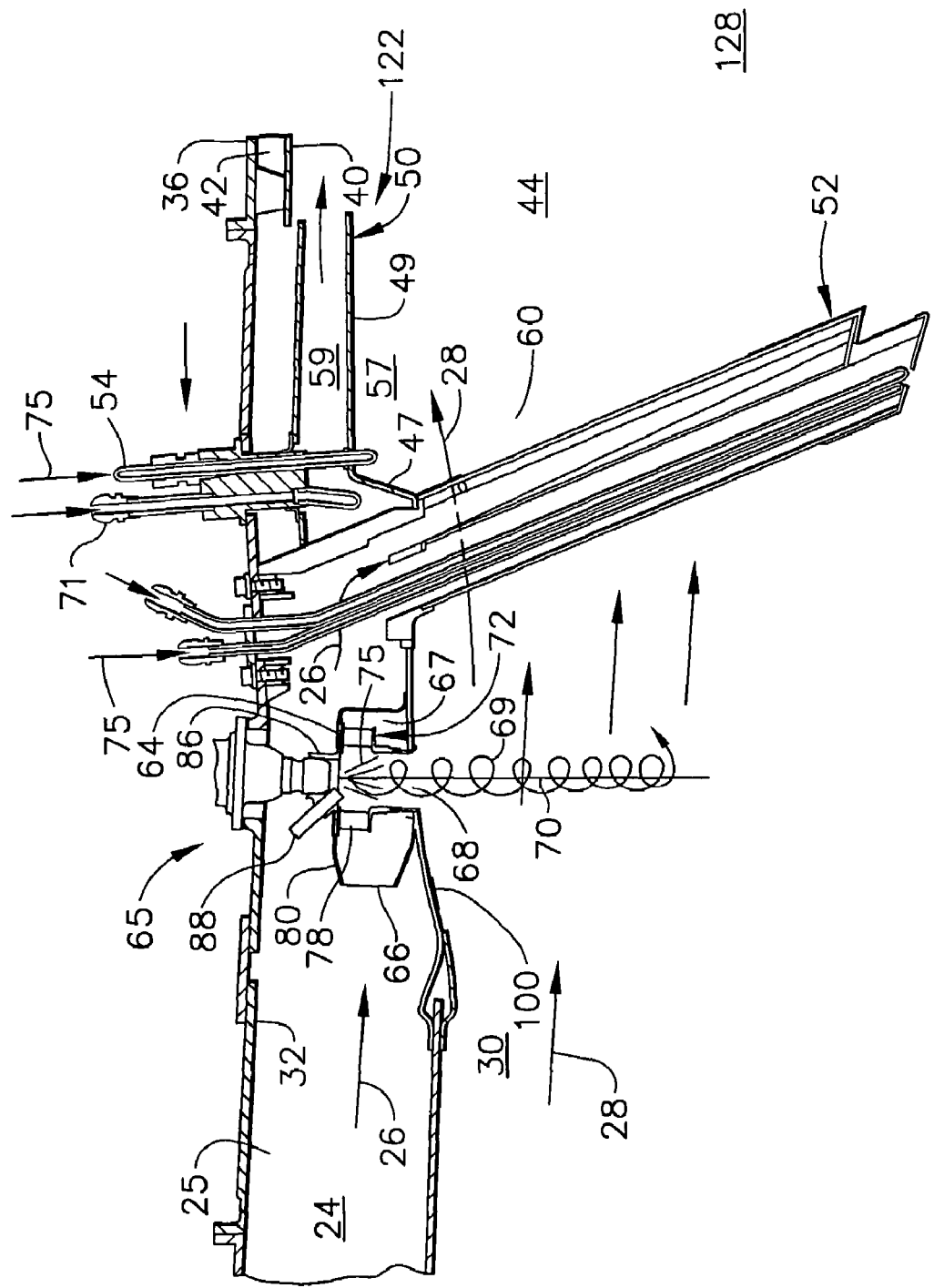
FIG. 2 is an enlarged axial sectional view illustration of the fuel/air swirler illustrated in FIG. 1.
Figure 3:
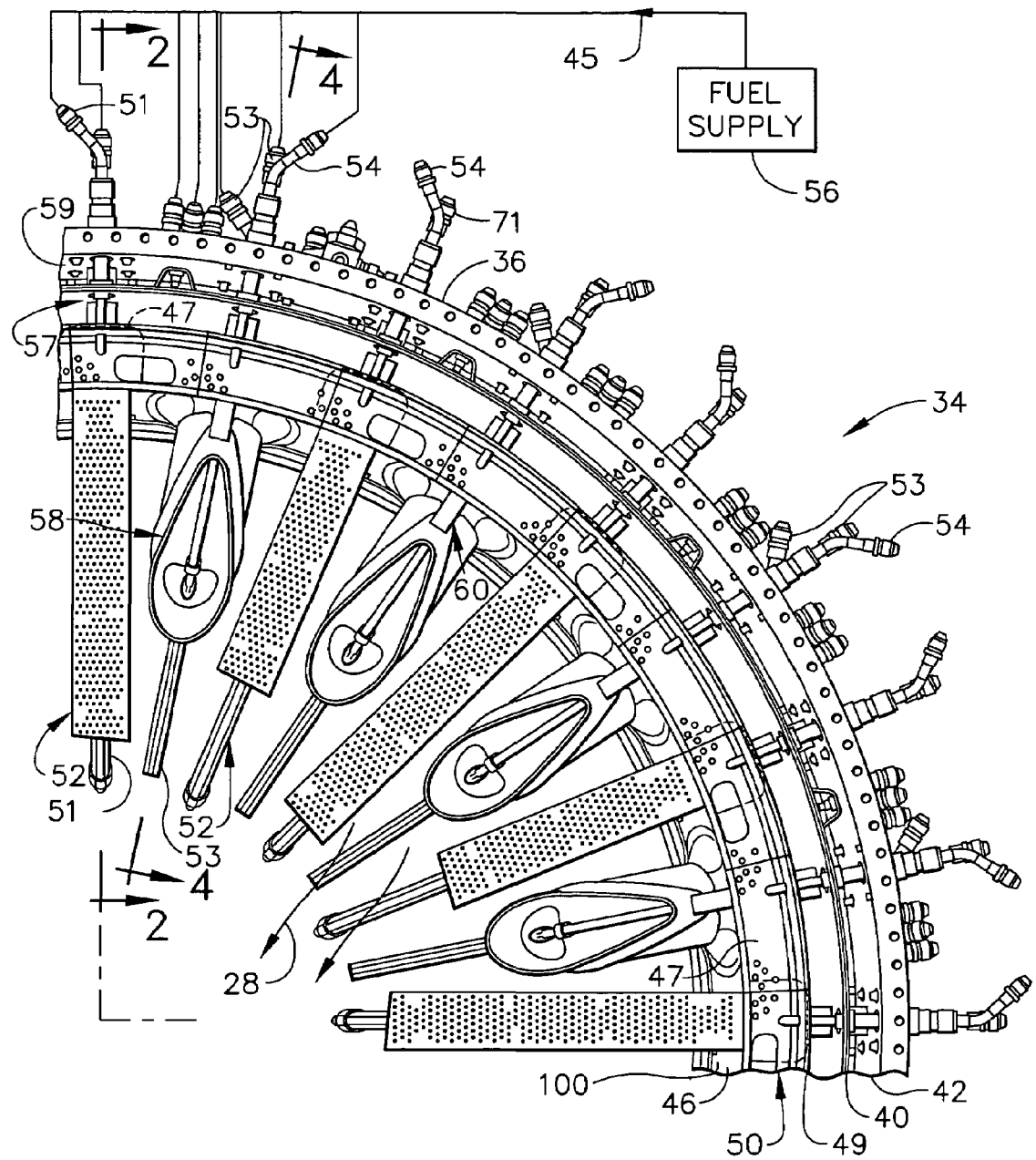
FIG. 3 is an aft-facing forward radial elevational view illustration of a portion of the augmenter illustrated in FIG. 1 and taken along line 3-3.

For the purposes of this patent, the augmenter 34 includes elements in the engine 10 extending aft of the turbines 20, 22 to the exhaust nozzle 38 as illustrated in FIGS. 1-3. The exemplary embodiment of the augmenter 34 illustrated herein includes a circumferential or step ring flameholder 50 at the outer diameter of the augmenter 34 for maximizing the effective flameholding area thereof. The step ring flameholder 50 is located in a radially outer portion 122 of the combustion zone 44 downstream of the radial flameholders 52 and has an aft-facing annular radial wall 47 attached to an axial wall 49. The aft-facing annular radial wall 47 axially adjoins the diffuser liner 46 and may be formed integrally therewith at the aft end thereof. The step ring flameholder 50 in axial section, as illustrated in FIG. 2, is in the form of an aft-facing step which defines a recirculation zone 57 providing a stagnation region for effecting flameholding capability thereat.

The exemplary embodiment of the augmenter 34 illustrated herein includes the plurality of circumferentially spaced apart radial flameholders 52 extending radially inwardly from the diffusion liner 46 into the exhaust flowpath 128 forward or upstream of the step ring flameholder 50. Each radial flameholder 52 includes one or more integral first fuel spraybars 51. The individual spraybars 51 are suitably joined in flow communication with a conventional fuel supply 56 which is effective for channeling fuel 45 to each of the spraybars for injecting the fuel 45 into the core gases 28 which flow into the combustion zone 44.

The step ring flameholder 50, radial flameholders 52, and injector chutes 58 collectively provide enhanced performance of the augmenter 34 while improving durability and effective life thereof. The individual radial flameholders 52 provide flameholding capability in conjunction with the step ring flameholder 50 disposed at the radially outer ends thereof which maximizes flameholding capability, efficiency, and performance. The augmenter 34 is effective for use in medium to high bypass ratio engines 10 which have relatively large fan discharge flowrates through the augmenter 34.

Figure 4:
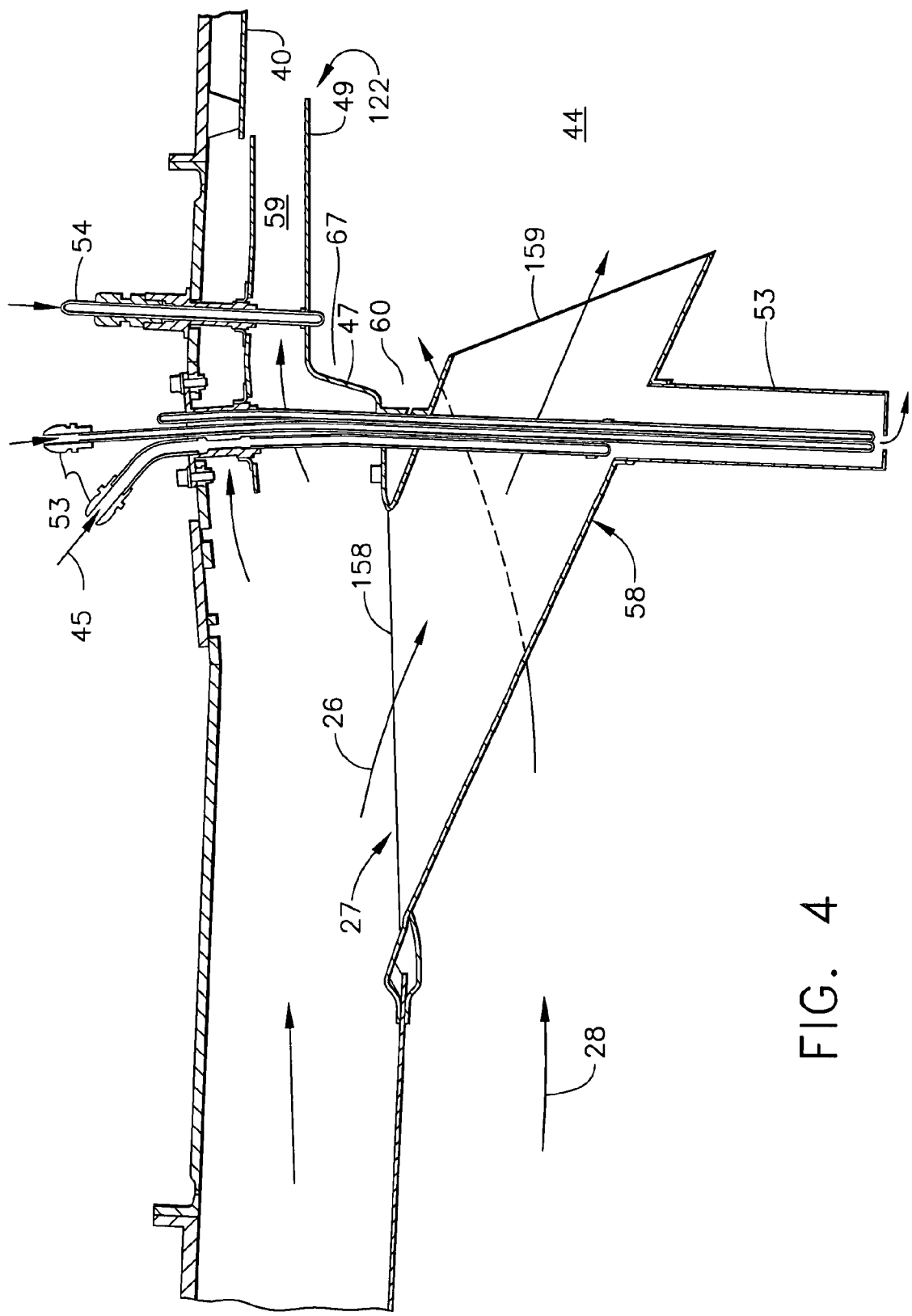
FIG. 4 is an axial sectional view illustration through an exemplary injector chute of the augmenter illustrated in FIG. 3 and taken generally along line 4-4 in FIG. 3.

The injector chutes 58 are used to channel the bypass air 26, as shown in FIGS. 3 and 4, radially inwardly toward the centerline of the engine for both effective mixing with the core gases 28 needed for dry performance, and for isolating the relatively cold bypass air 26 away from the relatively hot recirculation zone 57 of the step ring flameholder 50 during reheat operation for promoting combustion stability. The injector chutes 58 are spaced radially inwardly of the step ring flameholder 50 at the radial wall 47 thereof to define a radial buffer zone 60. The buffer zone 60 at each of the chutes 58 allows the core gases 28 to reattach axially therein directly below the step ring flameholder 50 for promoting combustion stability and maintaining a more uniform hot core gas temperature around the inner circumference of the ring flameholder.

The individual chutes 58 are interposed between adjacent radial flameholders 52. The hot core gases 28 flow axially around each of the radial flameholders 52 and chutes 58. The core gases 28 therefore bound the inboard side of the step ring flameholder 50. By spacing the chute outlets 159 radially inwardly below the step ring flameholder 50 and the recirculation zone 57, the bypass air 26 is injected into the combustion zone 44 radially inwardly of the buffer zone 60 to promote combustion stability in the step ring flameholder 50, and reduce circumferential temperature gradients.

In this way, a more uniform circumferential temperature distribution of the step ring flameholder 50 may be maintained in operation, during both dry and reheat operation, for improving the durability and useful life of the step ring flameholder 50. The chutes 58 channel the bypass air 26 more closely to the centerline of the engine for improving mixing effectiveness with the core gases 28. And most significantly, the relatively cold bypass air 26 is isolated from the recirculation zone 57 of the step ring flameholder 50 improving performance thereof, and improving combustion stability especially during initial ignition and propagation of the flame during reheat operation.

Each of the injector chutes 58 is illustrated as having an aerodynamically streamlined airfoil or teardrop-shaped for allowing the core gases 28 to reattach or rejoin in the buffer zones 60 inwardly of the step ring flameholder 50. Each of the injector chutes 58 is teardrop-shaped both axially and radially, with a minimum profile at the buffer zone 60 for improving circumferential flow uniformity of the core gases 28 below the step ring flameholder 50. Both the inlet 158 and outlet 159 of the chutes 58 are also generally teardrop-shaped in section.

Referring to FIG. 2, since the inboard side of the step ring flameholder 50 is directly subject to the hot core gases 28 flowing through the combustion zone 44, the step ring flameholder 50 is preferably cooled on its backside or radially outer surfaces. The step ring flameholder axial wall 49 is spaced radially inwardly from the combustion liner 40 to define a ring duct 59 for discharging the bypass air 26 into the combustion zone 44 along the inner surface of the combustion liner 40. In this way, the bypass air 26 flows over the backside of the step ring flameholder 50 for providing effective backside cooling thereof, and is then discharged along the inner surface of the combustion liner 40. The combustion liner 40 itself is also backside cooled, and may otherwise include conventional cooling features such as additional film cooling holes therethrough provided along the entire axial extent of the combustion liner 40.

Various locations are provided for the injection of fuel into the combustion zone 44 during reheat operation of the augmenter 34, as illustrated in FIGS. 2, 3, and 4. A plurality of second fuel spraybars 53 extending radially inwardly through respective ones of the injector chutes 58 for injecting fuel into the bypass air channeled therethrough. Each chute 58 may have one or more of the second fuel spraybars 53 extending therein for injecting the fuel 45 into the bypass air 26 inside each of the chutes 58. In the exemplary embodiment illustrated herein, two of the second fuel spraybars 53 also extend in part radially inwardly of each of the injector chutes 58, and are surrounded by a suitable heat shield, for additionally injecting the fuel 45 into the core gases 28 flowing into the combustion zone 44.

As illustrated in FIGS. 2, 3, and 4, a plurality of circumferentially spaced apart third fuel spraybars 54 extend radially inwardly through the step ring flameholder 50 for injecting fuel aft of the radial wall 47 thereof and into the recirculation zone 57 fed by the core gases 28 flowable thereat. A plurality of circumferentially spaced apart fourth fuel spraybars 71 extend radially inwardly into the step ring duct 59 for injecting fuel therein to mix with the bypass air 26 flowable therethrough. In this way, air flowing through the ring duct 59 is fueled during reheat operation and discharged into the combustion zone 44.

The step ring flameholder 50 effectively cooperates with the individual radial flameholders 52 for circumferentially propagating the flame between the radial flameholders 52 during initial ignition, conventionally provided in the step ring flameholder 50, and during propagation, as well as collectively providing therewith an efficient flameholder surface area for enhanced combustion stability during reheat operation. The embodiment of the radial flameholders 52 illustrated herein includes the first fuel spraybars 51 integrally therein and cooled by bypass air. Similar air cooled flameholders are disclosed in detail in U.S. Pat. Nos. 5,813,221 and 5,396,763 both of which are assigned to the present assignee.

The augmenter 34 requires an ignition source or pilot in the cases where the core gas conditions are not conducive to reliable auto-ignition during light-offs. An augmenter swirler pilot 65 in the turbofan gas turbine engine augmenter 34 includes a fuel/air swirler 64 disposed between an axially extending bypass flowpath 25 and an axially extending exhaust flowpath 128. In the exemplary embodiment of the augmenter swirler pilot 65 illustrated herein, the fuel/air swirler 64 is mounted to the mixer wall 100 upstream of radial flameholders 52. The fuel/air swirler 64 is illustrated herein as being circumferentially located between a pair of the tubular injector chutes 58. Though only one fuel/air swirler 64 is illustrated herein there may be designs where more than one are used.

The fuel/air swirler 64 includes a swirler inlet 66 axially open to and positioned substantially normal to the bypass flowpath 25 to receive bypass air 26. A swirler outlet 68 of the fuel/air swirler 64 is open to and positioned substantially parallel to the exhaust flowpath 128. A swirl chamber 67 within the fuel/air swirler 64 is operably disposed between the swirler inlet 66 and the swirler outlet 68 to swirl bypass air entering the swirler inlet 66.

The swirl chamber 67 produces swirling air 69 which swirls about a swirl axis 70 of the fuel/air swirler 64 extending through the swirler outlet 68 and being substantially normal to the exhaust flowpath 128. A fuel injector 86 is used to inject fuel 75 into the swirl chamber 67 to be mixed, swirled, and atomized with the swirling air 69 and an igniter 88 is used to ignite the resulting mixture of the atomized fuel 75 and the swirling air 69. The resulting mixture of the atomized fuel 75 and the swirling air 69 is ejected, while swirling about the swirl axis 70, through the swirler outlet 68 and into the exhaust flowpath 128. The ignited mixture then lights off the fuel 75 injected by the means for injecting fuel 45 into the exhaust flowpath 128 and air in the combustion zone 44. The igniter may be a spark plug or other sparking device for producing an electrical spark. A plasma from a microwave generator or a gaseous torch could also be used as igniters. The augmenter swirler pilot 65 provides a stable reacting light-off source for the flameholders to initiate thrust augmentation.

Figure 5:
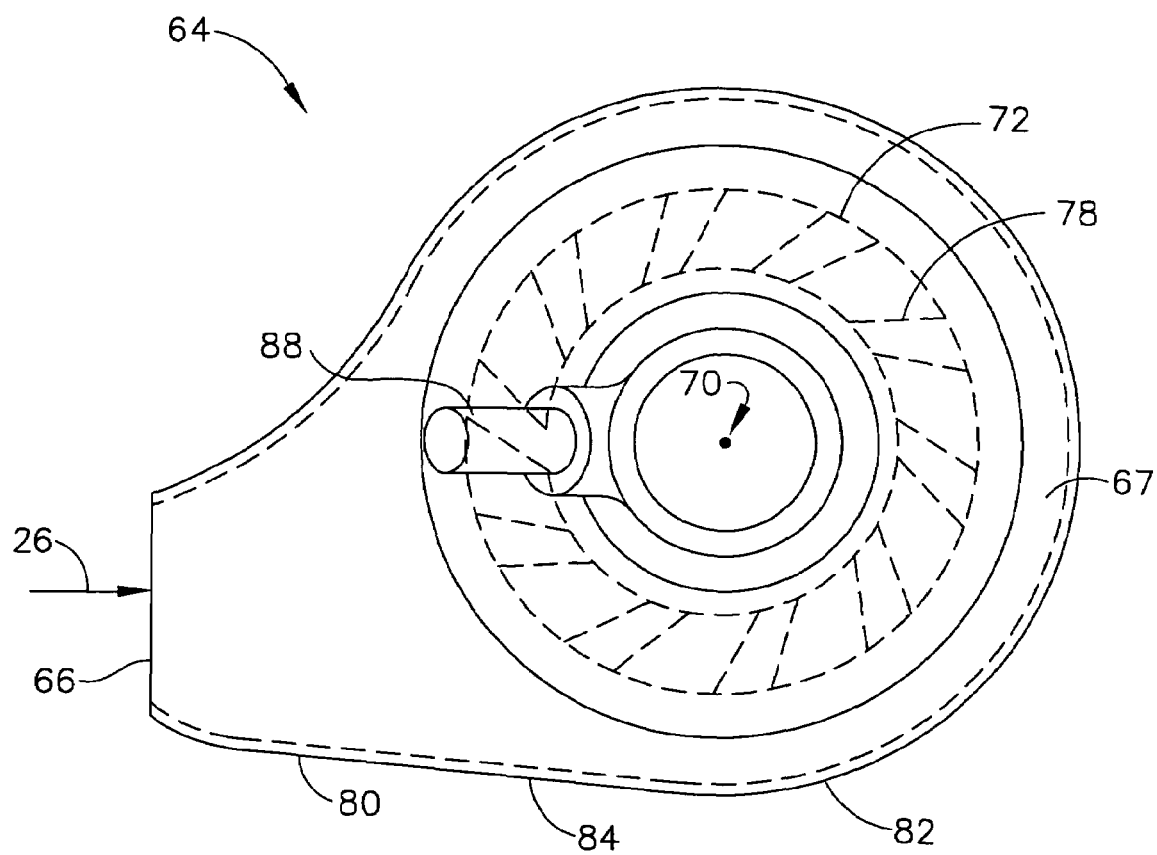
FIG. 5 is a radially inwardly facing partly sectional view illustration through the exemplary fuel/air swirler illustrated in FIG. 2.
Figure 6:
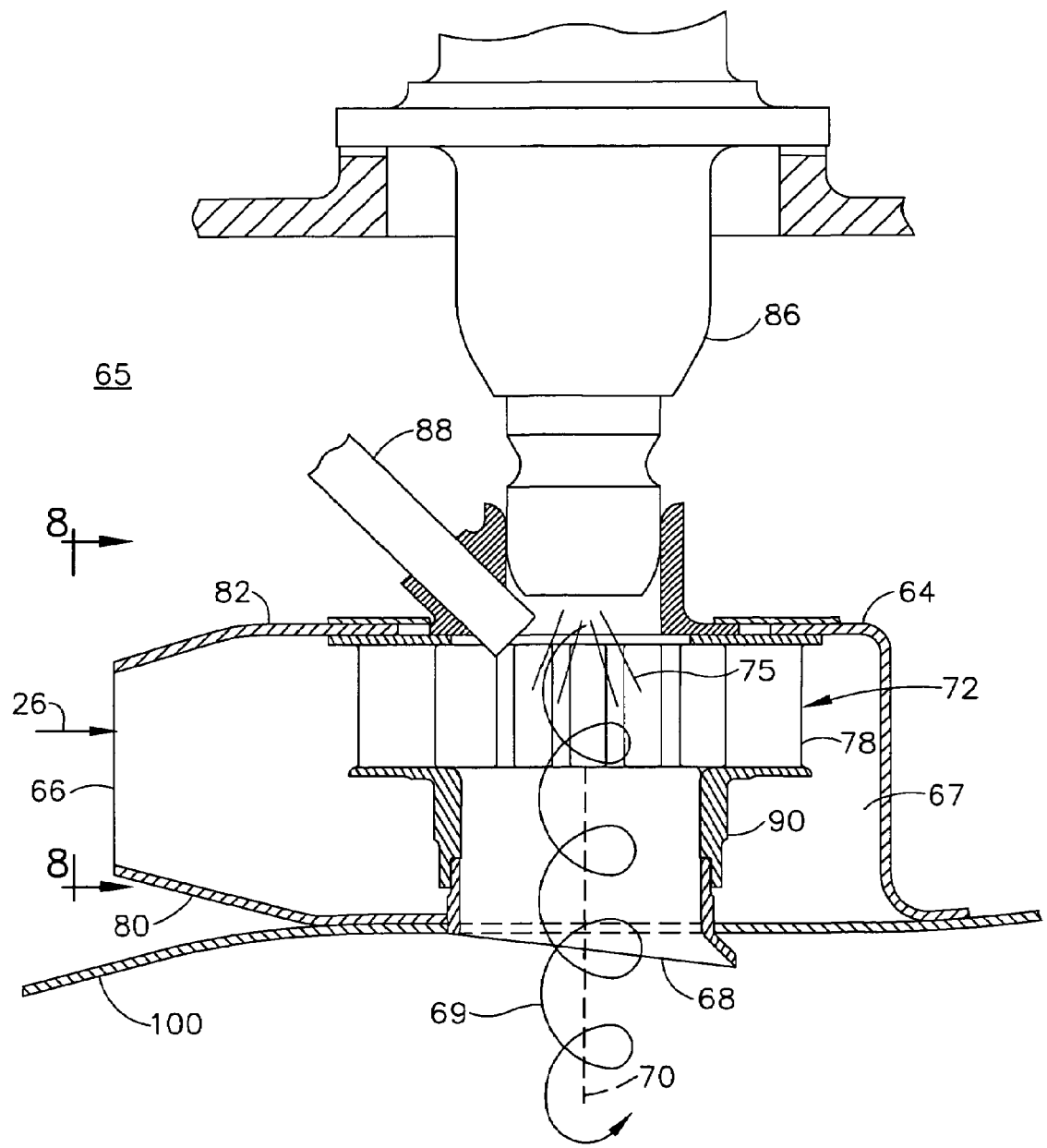
FIG. 6 is a circumferentially facing partly sectional view illustration through the exemplary fuel/air swirler illustrated in FIG. 2.
Figure 7:
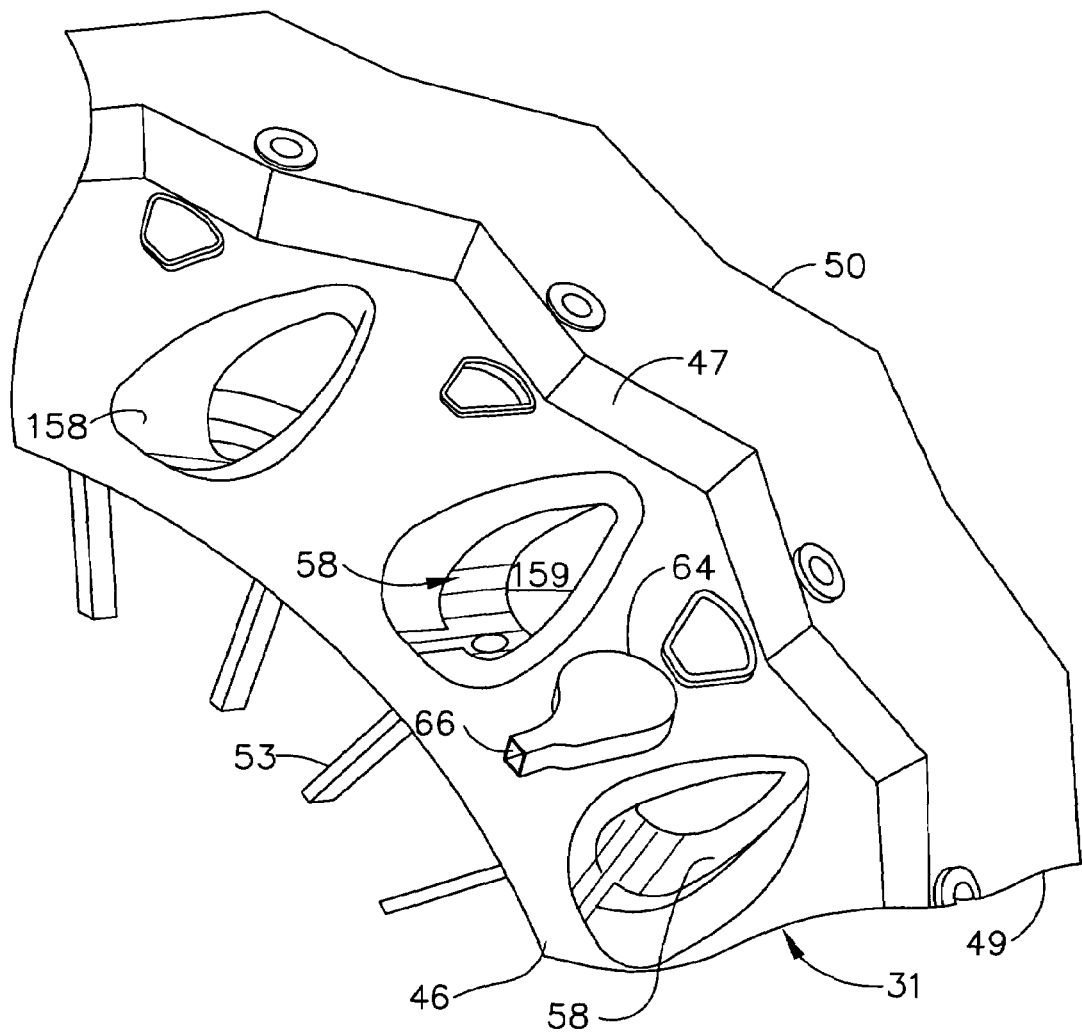
FIG. 7 is a radially inwardly looking perspective view illustration of a mixer upon which is mounted the exemplary fuel/air swirler illustrated in FIG. 2.
Figure 8:
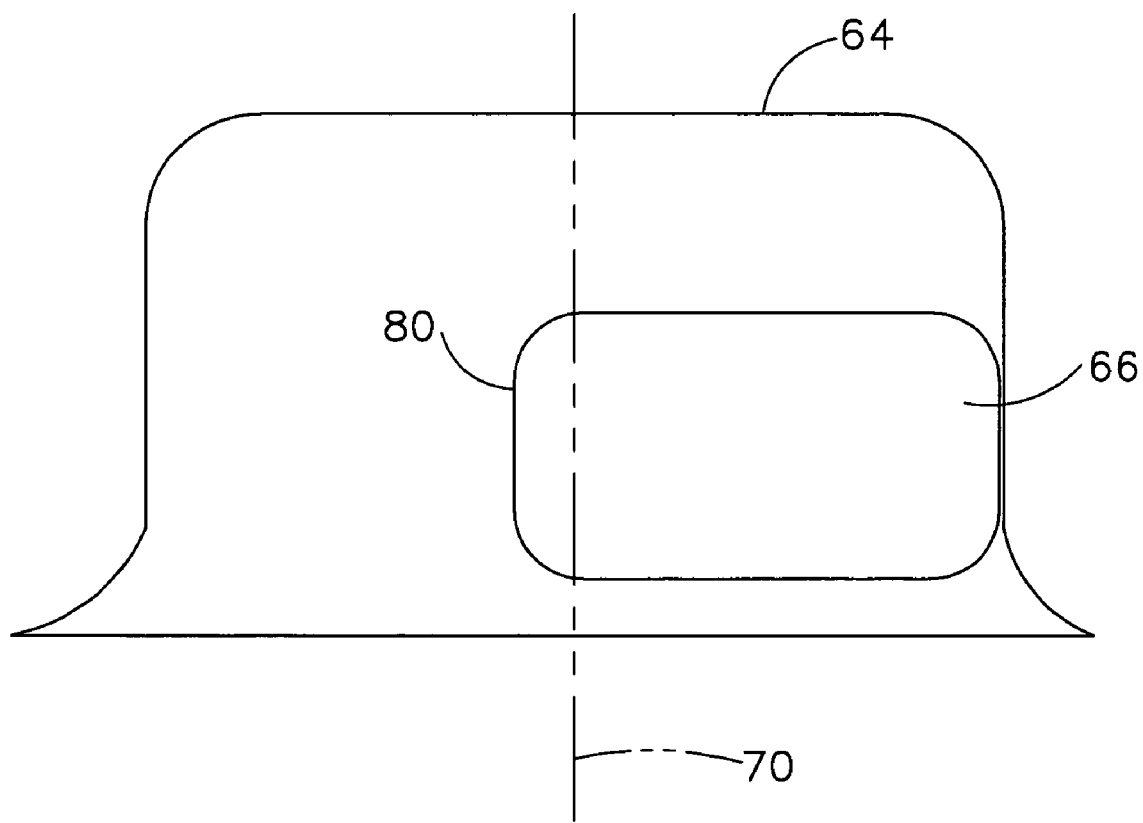
FIG. 8 is an axially aftwardly facing sectional view illustration of the exemplary fuel/air swirler illustrated in FIG. 6 and taken generally along line 8-8 in FIG. 6.

The exemplary embodiment of the fuel/air swirler 64 illustrated in FIGS. 5 and 6 includes an air swirler 72 within a rounded swirler housing 82 of the fuel/air swirler 64. The air swirler 72 is centered about the swirl axis 70 within the housing 82 of the fuel/air swirler 64. The air swirler 72 may be louvered or have a plurality of swirling vanes 78. The swirler inlet 66 is radially offset with respect to the swirl axis 70, as illustrated in FIG. 8, to help the rounded swirler housing 82 impart a swirl to the bypass air 26 entering the swirl chamber 67 within the swirler housing 82. The air swirler 72 greatly increases the amount of swirl imparted by the fuel/air swirler 64.

Figure 9:
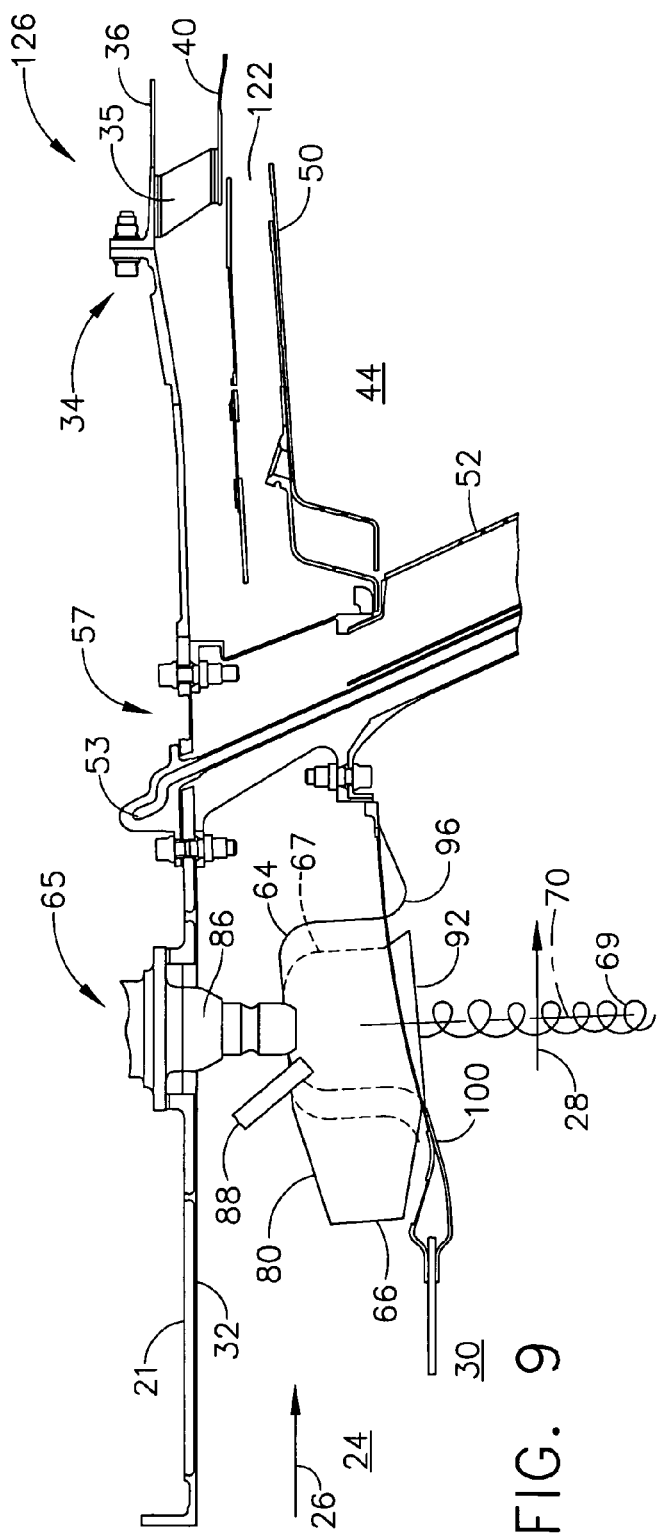
FIG. 9 is an enlarged axial sectional view illustration of the fuel/air swirler illustrated in FIG. 1 with a swirler cup having a tilted edge.
Figure 10:
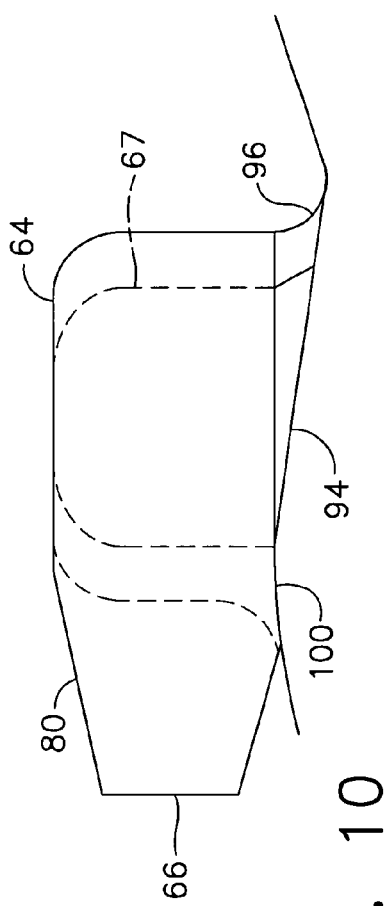
FIG. 10 is an enlarged axial sectional view illustration of the fuel/air swirler illustrated in FIG. 1 with a swirler cup having a chamfered edge.

An exemplary embodiment of the air swirler 72 is a swirler cup 90 which may be louvered or have the plurality of swirling vanes 78. The distinction between the two is that the louvered swirler cup has angled slits which are angled with respect to the swirl axis 70 while the swirling vanes 78 are disposed at an angle with respect to the swirl axis 70 in an open annulus in the swirler cup 90 and centered about the swirl axis 70. The swirler cup 90 may include a tilted edge 92 as illustrated in FIG. 9 or a chamfered edge 94 as illustrated in FIG. 10. The mixer wall 100 may be provided with a rounded lip 96, at least in the vicinity of the swirler cup 90, which together with the tilted or chamfered edges 92 and 94 may be used to provide obscuration of the swirler cup 90.

The exemplary embodiment of the fuel/air swirler 64 illustrated herein includes an air scoop 80 leading from the swirler inlet 66 to a rounded swirler housing 82. The air swirler 72 is disposed within the rounded swirler housing 82. The air scoop 80 has a swirler inlet sidewall 84 extending from the swirler inlet 66 to the swirler housing 82 and the swirler inlet sidewall 84 is substantially tangentially attached to the swirler housing 82. An exemplary embodiment of the air swirler 72 is a swirler cup 90 which may be louvered or have a plurality of swirling vanes 78. The air scoop 80 and swirler inlet sidewall 84 increase the amount of swirl imparted the rounded swirler housing 82.

The augmenter 34 described above improves durability of the exhaust system as well as provides for higher thrust derivative products by the new combination of the cooled step ring and radial flameholders 50, 52, and injector chutes 58. The cooled flameholders with integral fuel injection improve auto-ignition margin, as well as reduces fuel coking and boiling. The performance augmenter 34 provides improved efficiency during both dry and reheat operation of the augmenter. The individual injector chutes 58 are isolated or decoupled from the step ring flameholder 50 as described above for improving thermal durability of the step ring flameholder 50 itself by reducing circumferential temperature variations, as well as improved combustion stability during light-off propagation by isolating the recirculation zone 57.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed:

1. A turbofan gas turbine engine augmenter comprising:
    a fuel/air swirler disposed between an axially extending bypass flowpath and an axially extending exhaust flowpath,
    the fuel/air swirler including a swirler inlet axially open to and positioned substantially normal to the bypass flowpath,
    the fuel/air swirler including a swirler outlet open to and positioned substantially parallel to the exhaust flowpath,
    a swirl chamber within the fuel/air swirler operably disposed between the swirler inlet and the swirler outlet, and
    a swirl axis of the fuel/air swirler extending through the swirler outlet and substantially normal to the exhaust flowpath.

2. An augmenter according to claim 1 further comprising an air swirler within the fuel/air swirler.

3. An augmenter according to claim 2 further comprising the air swirler being centered about the swirl axis within the fuel/air swirler.

4. An augmenter according to claim 2 further comprising the air swirler being a louvered swirler.

5. An augmenter according to claim 2 further comprising the air swirler having a plurality of swirling vanes.

6. An augmenter according to claim 2 further comprising the swirler inlet being radially offset with respect to the swirl axis.

7. An augmenter according to claim 6 further comprising:
    the fuel/air swirler having an air scoop leading from the swirler inlet to a rounded swirler housing of the fuel/air swirler,
    the air swirler being disposed within the rounded swirler housing,
    the air scoop having a swirler inlet sidewall extending from the swirler inlet to the swirler housing, and
    the swirler inlet sidewall being substantially tangentially attached to the swirler housing.

8. An augmenter according to claim 7 further comprising the air swirler being centered about the swirl axis within the fuel/air swirler.

9. An augmenter according to claim 7 further comprising the air swirler being a louvered swirler.

10. An augmenter according to claim 7 further comprising the air swirler having a plurality of swirling vanes.

11. An augmenter according to claim 2 further comprising:
a swirler housing surrounding the air swirler,
the swirler inlet leading into the swirler housing and the swirler outlet leading out from the swirler housing, and
a fuel injector disposed through the swirler housing and operably positioned to inject fuel into the swirl chamber.

12. An augmenter according to claim 11 further comprising an igniter disposed through the swirler housing and operably positioned for igniting fuel injected into the swirl chamber.

13. An augmenter according to claim 12 further comprising the air swirler being a louvered swirler centered about the swirl axis within the swirl chamber.

14. An augmenter according to claim 13 further comprising the swirler inlet being radially offset with respect to the swirl axis.

15. An augmenter according to claim 14 further comprising:
the swirler housing being a rounded swirler housing,
the fuel/air swirler having an air scoop leading from the swirler inlet to a rounded swirler housing of the fuel/air swirler,
the air swirler being disposed within the rounded swirler housing,
the swirler inlet sidewall being substantially tangentially attached to the swirler housing.

16. An augmenter according to claim 2 further comprising:
the air swirler including a swirler cup,
a swirler housing surrounding the swirler cup,
the swirler inlet leading into the swirler housing and the swirler outlet leading out from the swirler housing, and
a fuel injector disposed through the swirler housing and operably positioned to inject fuel into the swirl chamber.

17. An augmenter according to claim 16 further comprising an igniter disposed through the swirler housing and operably positioned for igniting fuel injected into the swirl chamber.

18. An augmenter according to claim 17 further comprising the swirler cup being louvered or having swirling vanes and centered about the swirl axis within the swirl chamber.

19. An augmenter according to claim 18 further comprising the swirler inlet being radially offset with respect to the swirl axis.

20. An augmenter according to claim 19 further comprising:
the swirler housing being a rounded swirler housing,
the fuel/air swirler having an air scoop leading from the swirler inlet to a rounded swirler housing of the fuel/air swirler,
the air swirler being disposed within the rounded swirler housing,
the air scoop having a swirler inlet sidewall extending from the swirler inlet to the swirler housing, and
the swirler inlet sidewall being substantially tangentially attached to the swirler housing.

21. An augmenter according to claim 16 further comprising the swirler cup having a tilted or chamfered edge.

22. An augmenter according to claim 1 further comprising a means for injecting fuel into the exhaust flowpath for combustion in a combustion zone downstream of the fuel/air swirler.

23. An augmenter according to claim 22 further comprising a plurality of circumferentially spaced apart radial flameholders extending radially across the combustion zone downstream of the fuel/air swirler.

24. An augmenter according to claim 23 further comprising a step ring flameholder located in a radially outer portion of the combustion zone downstream of the radial flameholders and including an aft-facing annular radial wall attached to an axial wall.

25. An augmenter according to claim 24 further comprising the means for injecting fuel including a plurality of first fuel spraybars.

26. An augmenter according to claim 25 further comprising each of the first fuel spraybars disposed within a corresponding one of the radial flameholders.

27. A turbofan gas turbine engine augmenter comprising:
a mixer disposed between an axially extending bypass flowpath and an axially extending exhaust flowpath and including a plurality of tubular injector chutes extending radially inwardly from the bypass flowpath to the exhaust flowpath,
circumferentially spaced apart radial flameholders extending radially inwardly into the exhaust flowpath downstream of the injector chutes,
a fuel/air swirler disposed upstream of radial flameholders between the bypass flowpath and the exhaust flowpath,
the fuel/air swirler including a swirler inlet axially open to and positioned substantially normal to the bypass flowpath,
the fuel/air swirler including a swirler outlet open to and positioned substantially parallel to the exhaust flowpath,
a swirl chamber within the fuel/air swirler operably disposed between the swirler inlet and the swirler outlet, and
a swirl axis of the fuel/air swirler extending through the swirler outlet and substantially normal to the exhaust flowpath.

28. An augmenter according to claim 27 further comprising:
the mixer having an annular mixer wall disposed between the axially extending bypass flowpath and the axially extending exhaust flowpath,
the tubular injector chutes being attached to the mixer wall and extending radially inwardly into the exhaust flowpath, and
the fuel/air swirler being mounted to the mixer wall and circumferentially located between a pair of the tubular injector chutes.

29. An augmenter according to claim 28 further comprising an air swirler centered about the swirl axis within the fuel/air swirler.

30. An augmenter according to claim 29 further comprising the air swirler being a louvered swirler.

31. An augmenter according to claim 29 further comprising the swirler inlet being radially offset with respect to the swirl axis.

32. An augmenter according to claim 31 further comprising:
the fuel/air swirler having an air scoop leading from the swirler inlet to a rounded swirler housing of the fuel/air swirler,
the air swirler being disposed within the rounded swirler housing,
the air scoop having a swirler inlet sidewall extending from the swirler inlet to the swirler housing, and
the swirler inlet sidewall being substantially tangentially attached to the swirler housing.

33. An augmenter according to claim 27 further comprising a means for injecting fuel into the exhaust flowpath for combustion in a combustion zone downstream of the fuel/air swirler.

34. An augmenter according to claim 33 further comprising a plurality of circumferentially spaced apart radial flameholders extending radially across the combustion zone downstream of the fuel/air swirler.

35. An augmenter according to claim 34 further comprising a step ring flameholder located in a radially outer portion of the combustion zone downstream of the radial flameholders and including an aft-facing annular radial wall attached to an axial wall.

36. An augmenter according to claim 35 further comprising the means for injecting fuel including a plurality of first fuel spraybars.

37. An augmenter according to claim 36 further comprising each of the first fuel spraybars disposed within a corresponding one of the radial flameholders.

38. An augmenter according to claim 28 further comprising:

the air swirler including a swirler cup, a swirler housing surrounding the swirler cup, the swirler inlet leading into the swirler housing and the swirler outlet leading out from the swirler housing, and a fuel injector disposed through the swirler housing and operably positioned to inject fuel into the swirl chamber.

39. An augmenter according to claim 30 further comprising the swirler cup having a tilted or chamfered edge.

40. An augmenter according to claim 39 further comprising the mixer wall having a rounded lip aft of and at least in the vicinity of the swirler cup.

41. An augmenter according to claim 40 further comprising the swirler cup being louvered or having swirling vanes and centered about the swirl axis within the swirl chamber.

* * * * *